J. HALLER.
HORSESHOE.
APPLICATION FILED AUG. 7, 1920.
1,397,046.
Patented Nov. 15, 1921.
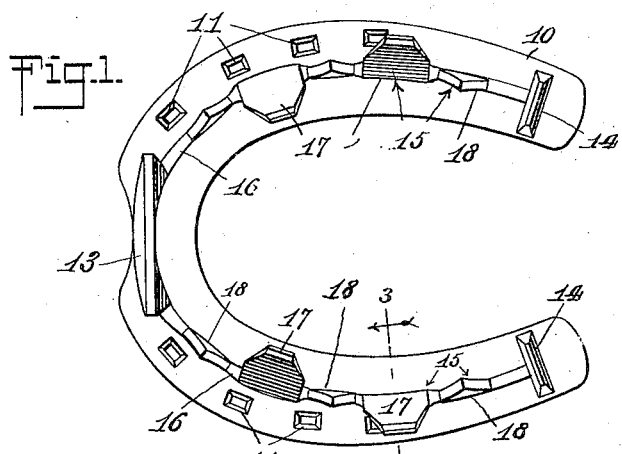
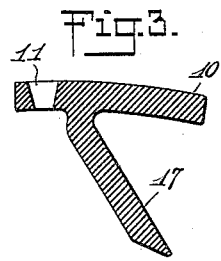
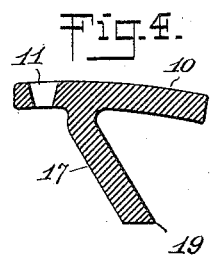
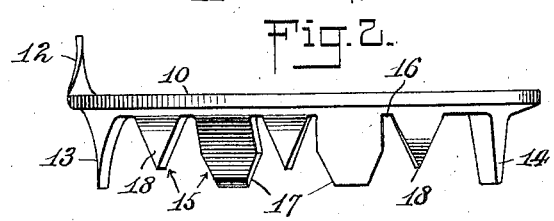
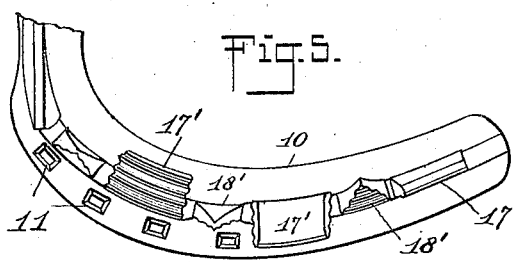
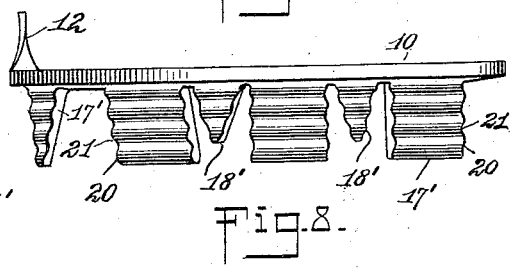
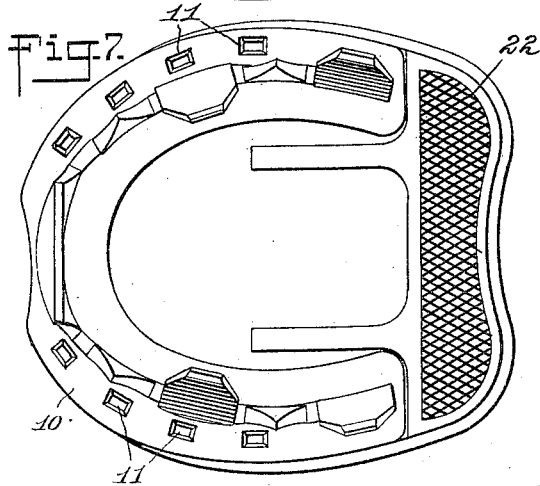
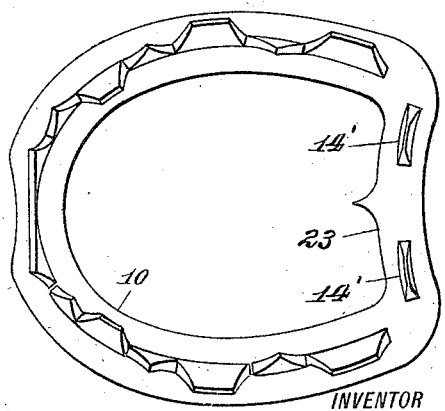
INVENTOR
John Haller:
BY
George Cook & Sons
ATTORNEYS

UNITED STATES PATENT OFFICE.

JOHN HALLER, OF BROOKLYN, NEW YORK.

HORSESHOE.

1,397,046. Specification of Letters Patent. Patented Nov. 15, 1921.

Application filed August 7, 1920. Serial No. 401,869.

*To all whom it may concern:*

Be it known that I, JOHN HALLER, a citizen of the United States, and a resident of New York, borough of Brooklyn, in the county of Kings and State of New York, have made and invented certain new and useful Improvements in Horseshoes, of which the following is a specification.

My invention relates to horseshoes and particularly to shoes designed and arranged for use during the winter months and adapted to prevent the slipping of the horse.

Horseshoes as heretofore constructed for winter use ordinarily include toe calks or in some instances are equipped with chains so as to prevent the horse from slipping or skidding, particularly when the pavement is covered with ice or snow. In all such shoes with which I am familiar, however, the anti-slipping devices rapidly wear and in the course of a few days entirely lose their anti-slipping qualities and act as a distinct detriment, in that not only is the horse not prevented from slipping but is liable to injury from the worn or blunt calks. It is accordingly an object of my invention to provide a horseshoe for use in preventing the slipping of the horse and to so design, arrange, and construct the shoe that its anti-slipping qualities will remain effective throughout the wearing life of the shoe.

In accomplishing the aforementioned ends I have provided a shoe having downwardly projecting calks which will remain substantially sharp throughout their normal life, the calks being arranged in spaced relation and so shaped and designed as to supplement each other in preventing the slipping of the shoe; the prevention of the shoe from slipping being first borne by one set of calks which upon becoming worn are supplemented by the second or intermediate set of calks.

With the foregoing and other objects in view which will appear as the description proceeds, my invention resides in the novel horseshoe illustrated in the accompanying drawing and described in the following specification, and in the combination and arrangement of parts and in the details of construction as hereinafter described and claimed, it being understood that changes may be made within the scope of the claims without departing from the spirit of the invention.

The preferred embodiment of my invention is disclosed in the accompanying drawings, wherein;

Figure 1 is a view in plan of my improved horseshoe;

Fig. 2 is a view in side elevation thereof;

Fig. 3 is a view in section taken on the line 3—3 of Fig. 1;

Fig. 4 is a similar view illustrating the calk of Fig. 3 after being subjected to wear;

Fig. 5 is a fragmental view in top plan of my improved horseshoe wherein the calks are provided with transverse corrugations or ribs;

Fig. 6 is a view in side elevation thereof;

Fig. 7 is a view in plan illustrating my improved shoe used in connection with a rubber pad;

Fig. 8 is a view of a bar shoe incorporating the characteristic features of my invention; and Fig. 9 is a fragmental view of a shoe having a somewhat modified form of calk.

Referring specifically to the several views, wherein similar reference numerals designate corresponding parts throughout, my improved horseshoe is composed of the body portion 10 of the usual shape and is provided with the nail openings 11 therein and the customary upwardly-extending toe-clip 12.

In order to positively prevent the shoe from slipping regardless of the condition of the pavements or surface upon which the shoe rests, I have provided the shoe with a plurality of downwardly-extending calks which in the shoe illustrated in Figs. 1 and 2 include the toe calks 13, the heel calks 14, and the intermediate portion or quarters calks 15. The toe calk is preferably composed of one piece as illustrated and extends across the front or toe portion of the shoe and is connected to the quarters calk on each side by the intermediate rib 16, thus bracing and reinforcing the body of the shoe and the several calks. The heel calks 14 preferably extend transversely to the body of the shoe and are also connected to the intermediate or quarters calks by the ribs 16.

The intermediate calks 15 which supplement the toe and heel calks are preferably composed of two distinct types, the alternate calks 17 which are fairly blunt and substantially trapezoidal in outline, and the intermediate calks 18 which are somewhat smaller and substantially triangular in outline. The alternate calks 17 extend at an angle to the vertical when the shoe is in normal position and are bent or project first to one side and then to the other side of the vertical, as more clearly illustrated in Figs. 1 and 5, while the intermediate and triangular-shaped calks 18 extend substantially vertical. This inclination of the calks provides that a sharp edge 19 will always be maintained upon the calks 17 as they wear away, thus insuring a positive grip upon the ground or pavement and preventing the slipping of the horse under the most adverse conditions or circumstances. The quarters calks are connected by the rib 16, thus insuring the bracing of the body of the shoe and the several calks. In the actual use of my improved shoe, after the calks 17 become worn, the intermediate triangular calks 18 will then contact with the ground and, being sharp, will assist in preventing the slipping of the shoe.

In order to more positively insure the calks to remain sharp at all times, I have provided the shoe as illustrated in Figs. 5 and 6 wherein the calks are provided with transverse ribs 20 and intermediate corrugations 21, the corrugations upon the intermediate calks 18' being out of alinement with relation to the ribs and corrugations upon the alternate calks 17'. The provision of the ribs and corrugations causes the calks to wear sharp, particularly when one of the ribs has been completely worn away, and the staggered relation of the ribs on the calks provides that one of the sets of calks will always be sharp, the burden of preventing the shoe from slipping being thus alternatively borne by the one set of calks and then by the other set of calks.

I have illustrated further applications of my improved shoe in Figs. 7 and 8, wherein Fig. 7 discloses my improved shoe with the heel portions cut away and used in connection with a rubber pad 22, while the shoe illustrated in Fig. 8 is what is known as a bar shoe, including as it does the heel bar 23 and upon which the heel calks 14' are placed.

A somewhat further modified form of my shoe is illustrated in Fig. 9, wherein the quarters calks are provided with openings 24 therein, the openings in the calks being also placed in staggered relation, so that as the calks wear, first one set of calks will be bifurcated and form two sharp gripping portions, and the further wear will then cause the intermediate calks to be split up into two sharp side portions.

From the foregoing it will be apparent that I have provided a shoe which is particularly adapted for use in connection with pavements which are covered with ice or snow or in any manner rendered particularly slippery or difficult for the horse to negotiate. Further, the very material size of the calks and their angular position provide for the long life of the shoe and its efficient action during such long wearing life. Thus with my improved shoe a set may be applied to a horse at the beginning of the winter and will last over a very considerable period of time and thus do away with the almost constant reshoeing of horses, as is necessary with the present type of horseshoe during the winter months.

Having thus described and explained my invention, I claim and desire to secure by Letters Patent:

1. A horseshoe comprising a body portion and calks projecting downwardly therefrom and provided with transverse ribs and corrugations.

2. A horseshoe comprising a body portion and downwardly projecting calks, the alternate calks being inclined to the vertical when the shoe is in normal position, said calks provided with transverse corrugations.

3. An anti-slipping horseshoe comprising a body portion, toe and heel calks carried thereby, quarters calks composed of alternate and intermediate calks, the alternate calks being substantially trapezoidal in outline and inclined to the vertical and provided with transverse ribs and corrugations, substantially as described.

4. A horseshoe comprising a body portion, toe and heel calks carried thereby, quarters calks composed of alternating and intermediate calks, the alternating calks being substantially trapezoidal in outline and the intermediate calks being substantially triangular in outline, the alternating and intermediate calks being inclined with respect to the vertical and in opposite directions, considered when the shoe is in its normal position.

Signed at New York, borough of Manhattan, in the county of New York and State of New York, this 4th day of August, A. D. 1920.

JOHN HALLER.

Witnesses:
A. M. LINDENSTRUTH,
ANNE V. WALSH.